United States Patent
Lee

(10) Patent No.: US 7,860,123 B2
(45) Date of Patent: Dec. 28, 2010

(54) METHOD FOR TRANSMITTING PACKETS IN A WIRELESS COMMUNICATION SYSTEM AND AN APPARATUS USING THE SAME

(75) Inventor: Jia-Ching Lee, Hsinchu (TW)

(73) Assignee: Ralink Technology Corp., Jhubei, Hsinchu County (TW)

( * ) Notice: Subject to any disclaimer, the term of this patent is extended or adjusted under 35 U.S.C. 154(b) by 149 days.

(21) Appl. No.: 12/264,245

(22) Filed: Nov. 3, 2008

(65) Prior Publication Data
US 2009/0262752 A1 Oct. 22, 2009

(30) Foreign Application Priority Data
Apr. 21, 2008 (TW) .............................. 97114472 A

(51) Int. Cl.
*H04J 3/00* (2006.01)
(52) U.S. Cl. ..................................... 370/464
(58) Field of Classification Search ........................ None
See application file for complete search history.

(56) References Cited

U.S. PATENT DOCUMENTS

| | | | |
|---|---|---|---|
| 4,644,351 A * | 2/1987 | Zabarsky et al. ........... 340/7.21 |
| 5,790,626 A * | 8/1998 | Johnson et al. ............... 377/69 |
| 2007/0195761 A1 * | 8/2007 | Tatar et al. .................. 370/389 |
| 2007/0195777 A1 * | 8/2007 | Tatar et al. .................. 370/392 |
| 2007/0195778 A1 * | 8/2007 | Tatar et al. .................. 370/392 |
| 2008/0270866 A1 * | 10/2008 | Choi et al. .................. 714/748 |
| 2010/0098006 A1 * | 4/2010 | Golitschek Edler Von Elbwart et al. .............................. 370/329 |

* cited by examiner

*Primary Examiner*—Chi H Pham
*Assistant Examiner*—Fan Ng
(74) *Attorney, Agent, or Firm*—Winston Hsu; Scott Margo

(57) ABSTRACT

A wireless communication apparatus includes a first interface, a packet memory, a shift register set, and a second interface. The first interface receives a plurality of packets and stores the plurality of packets in the packet memory. The addresses of the plurality of packets stored in the packet memory are recorded in the shift register set. The second interface reads the packets in the packet memory according to the addresses of the packets recorded in the shift register set and then sends to a receiver. After an acknowledge signals from the receiver is received, the addresses of the successfully transmitted packets are cleared from the shift register set.

9 Claims, 5 Drawing Sheets

METHOD FOR TRANSMITTING PACKETS IN A WIRELESS COMMUNICATION SYSTEM AND AN APPARATUS USING THE SAME

BACKGROUND OF THE INVENTION

1. Field of the Invention

The present invention relates to a wireless communication apparatus, and more particularly, to a wireless communication apparatus to implement the selective repeat scheme for ARQ.

2. Description of the Prior Art

In wireless communication system, the packets transmitting in the communication channels may have errors because of bad communication environments. The communication channel is influenced by noise, channel change, multiple path decay, or channel coupling so as to cause the packets transmitting errors. In most communication system, such as wireless communication, the technique that allows erroneous data to be retransmitted is used to increase the reliability of the data transmission. Automatic Repeat Request (ARQ) is generally used in wireless communication to ensure the protocol data units (PDUs) transmitting from a sender station to a receiver station. ARQ uses error detection codes during transmission. The receiver station determines if the PDUs are received correctly according to the error detection codes. In addition, ARQ uses a feedback mechanism so that the receiver station can notify the sender station if the PDUs are received correctly. The sender station determines if resend the PDUs according the feedback result provided by the receiver station. There are three ARQ schemes: stop-and-wait, go-back-N, and selective repeat.

In the stop-and-wait scheme, the sender station transmits a packet to the receiver station, starts a timer, and waits for an acknowledgment (ACK) from the receiver station. If the packet is received correctly, the receiver station sends a positive acknowledgment and the sender station can transmit the next packet. If the timer expires, the sender station retransmits the packet, restarts the timer, and waits for an acknowledgment. This scheme is quite simple but very inefficient because of the idle time spent in waiting for an acknowledgment after each retransmission.

In the go-back-N scheme, the sender station transmits packets one after another until it receives a negative acknowledgment. Upon reception of a negative acknowledgment, the sender station retransmits the negatively acknowledged packet and all the packets following it. This scheme is more efficient than the stop-and-wait protocol when the transmission error rate is not too high and the link propagation delay is small. The major cause of the inefficiency associated with this scheme is due to the retransmission of many correctly received packets.

In the selective repeat scheme, the sender station transmits packets one after another until it receives a negative acknowledgment. Upon reception of a negative acknowledgment, the sender station retransmits only the packets in error. The selective repeat scheme is the most efficient method. However, this scheme breaks the order of the packets, so the receiver station has to process the packets in a corresponding way.

In conclusion, in three ARQ schemes, the stop-and-wait scheme is the simplest but the most inefficient. The go-back-N scheme is more efficient than the stop-and-wait scheme, but the go-back-N scheme still transmits the packets in order. For an advanced efficiency, the selective repeat scheme is used. Thus, a wireless communication apparatus for the selective repeat scheme should be developed.

SUMMARY OF THE INVENTION

According to an embodiment of the present invention, a wireless communication apparatus comprises a packet memory, a first interface, a shift register set, and a second interface. The first interface is coupled to the packet memory, for receiving a packet and storing the packet in the packet memory. The shift register set is coupled to the first interface, for recording an address of the packet stored in the packet memory. The second interface is coupled to the packet memory and the shift register set, for accessing the shift register set so as to read and send the packet stored in the packet memory according to the address of the packet recorded in the shift register set.

According to another embodiment of the present invention, a method of transmitting packets in a wireless communication system, comprises: receiving a plurality of packets; storing the plurality of packets in a packet memory; recording addresses of the packets stored in the packet memory according to the order of receiving the plurality of packets; reading and sending the plurality of packets stored in the packet memory according to the addresses of the plurality of packets; and clearing the addresses of the packets according to an acknowledge (ACK) signal of sending the plurality of packets.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
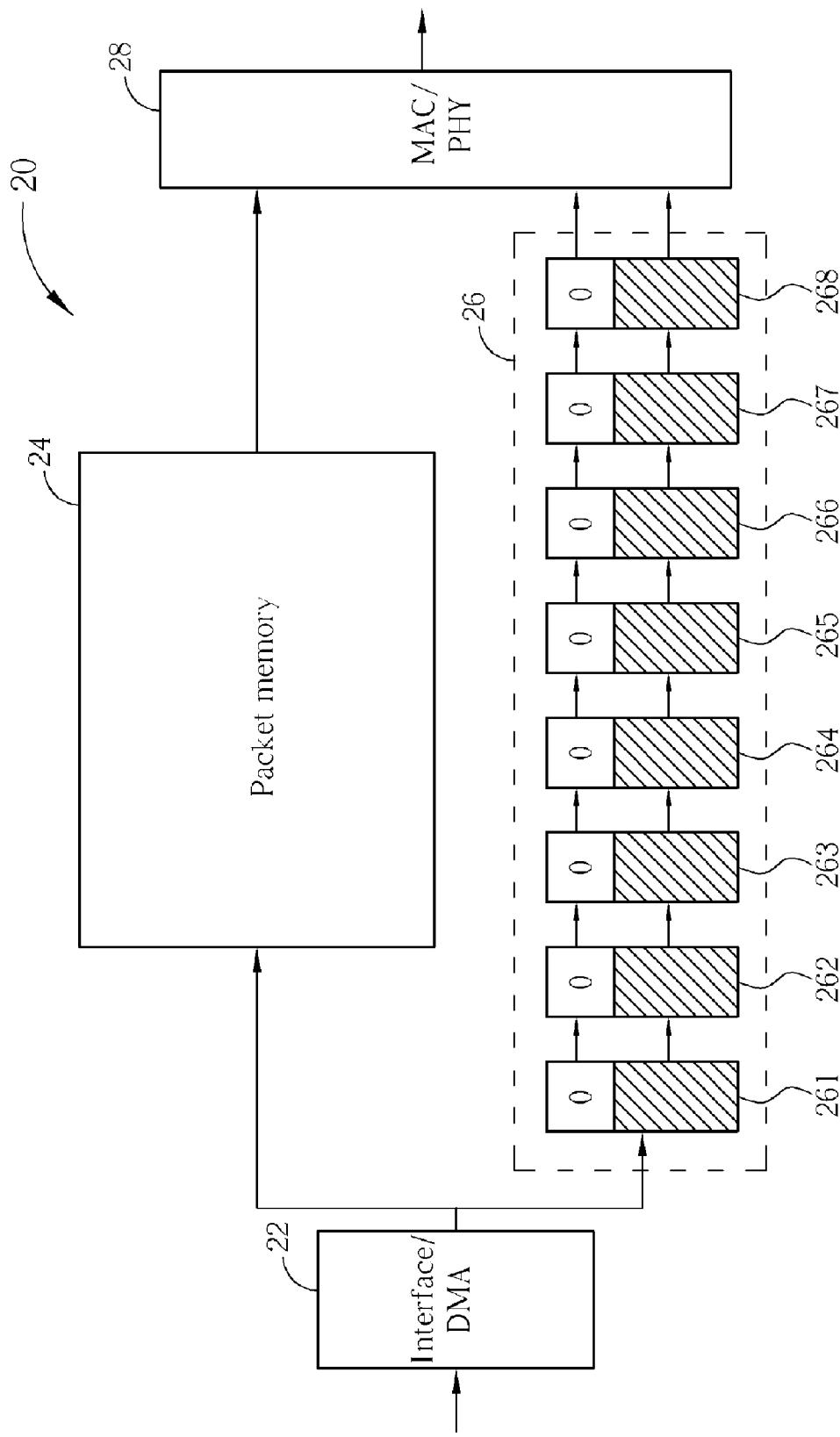
FIG. 1 is a diagram of a wireless communication apparatus according to the present invention.

Please refer to FIG. 1. FIG. 1 is a diagram of a wireless communication apparatus 20 according to an embodiment of the present invention. The wireless communication apparatus 20 is a transceiver, for example. The wireless communication apparatus 20 comprises a first interface 22, a packet memory 24, a shift register set 26, and a second interface 28. The first interface 22 comprises a direct memory access (DMA) interface. The second interface 28 comprises a medium access control (MAC) or a physical layer (PHY). The first interface 22 receives a packet from a host and stores the packet in the packet memory 24. An address (or a pointer) of the packet stored in the packet memory 24 is recorded in the shift register set 26. The shift register set 26 comprises a plurality of shift registers. Each address of the packet is inputted into the first shift register of the shift register set. Each shift register moves the address of the packet to the next shift register according to a valid bit of the next shift register. When the valid bit of the shift register is configured to "0", the shift register can record an address. When the shift register records the address, the valid bit of the shift register is configured to "1". When the valid bit of the next shift register is "0", the shift register moves the address to the next shift register and the valid bit of the shift register is configured to "0". The second interface 28 checks the valid bits of the shift register set from the last shift register to the first shift register (in the reverse direction of the shift register moving the address). The second interface 28 stops checking the valid bits of the shift register set 26 until a valid bit "0" is detected. According to the addresses recorded in the shift registers of the detected valid bits "1", the second interface 28 reads the packets stored in the packet memory 24 and send the packets to a receiver in order. In this embodiment, the shift register set 26 comprises a first shift register 261 to a eighth shift register 268. Each shift register can record an address, so the shift register set 26 can record eight addresses.

Figure 2:
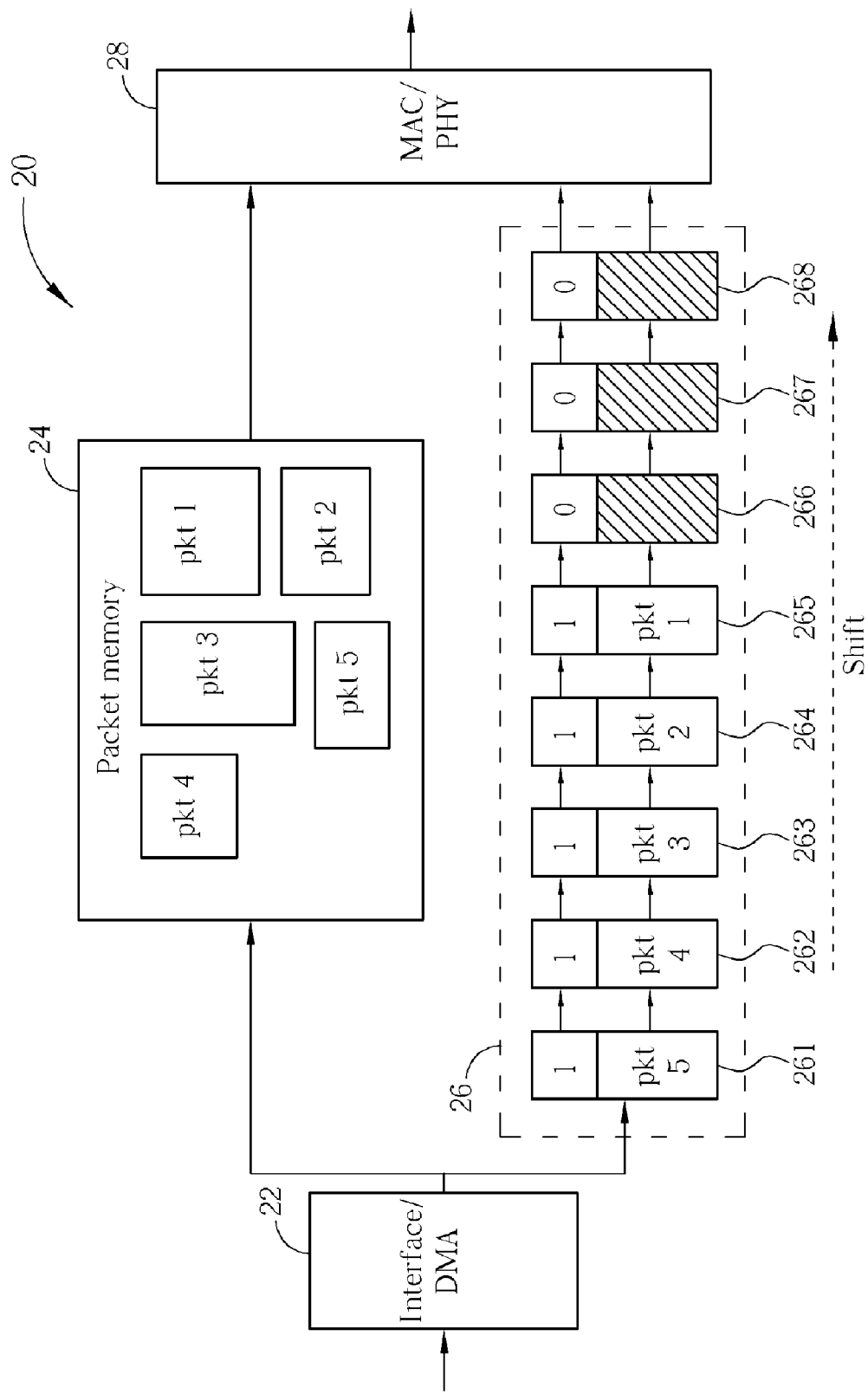
FIG. 2 to FIG. 5 shows an embodiment of the wireless communication apparatus in FIG. 1 transmitting packets.

Please refer to FIG. 2 to FIG. 5, showing an embodiment of the wireless communication apparatus 20 in FIG. 1 transmitting packets. The valid bits of the first shift register 261 to eighth shift register 268 are configured to "0" initially, as shown in FIG. 1. When the first interface 22 receives a first pkt1, the first interface 22 stores the first packet pkt1 in the packet memory 24. The address of the first packet pkt1 is recorded in the first shift register 261 and the valid bit of the first shift register 261 is configured to "1". Because the valid bit of the second shift register 262 is "0", the address of the first packet pkt1 recorded in the first shift register 261 is moved to the second shift register 262. Thus, the valid bit of the second shift register 262 is configured to "1", and the valid bit of the first shift register 261 is configured to "0". Then, the first interface 22 receives a second packet pkt2. Similarly, the first interface 22 stores the second packet pkt2 in the packet memory 24. The address of the second packet pkt2 is recorded in the first shift register 261 and the valid bit of the first shift register 261 is configured to "1". Because the valid bit of the third shift register 263 is "0", the address of the first packet pkt1 recorded in the second shift register 262 is moved to the third shift register 263. The valid bit of the second shift register 262 is configured to "0" again, so the address of the second packet pkt2 recorded in the first shift register 261 is moved to the second shift register 262. Thus, the valid bit of the first shift register 261 is configured to "0". Accordingly, the first interface 22 continues to receive a third packet pkt3, a fourth packet pkt4, and a fifth packet pkt5, so the state of the shift register set 26 recording the addresses of the packet pkt1 to packet pkt5 is shown in FIG. 2.

Figure 3:
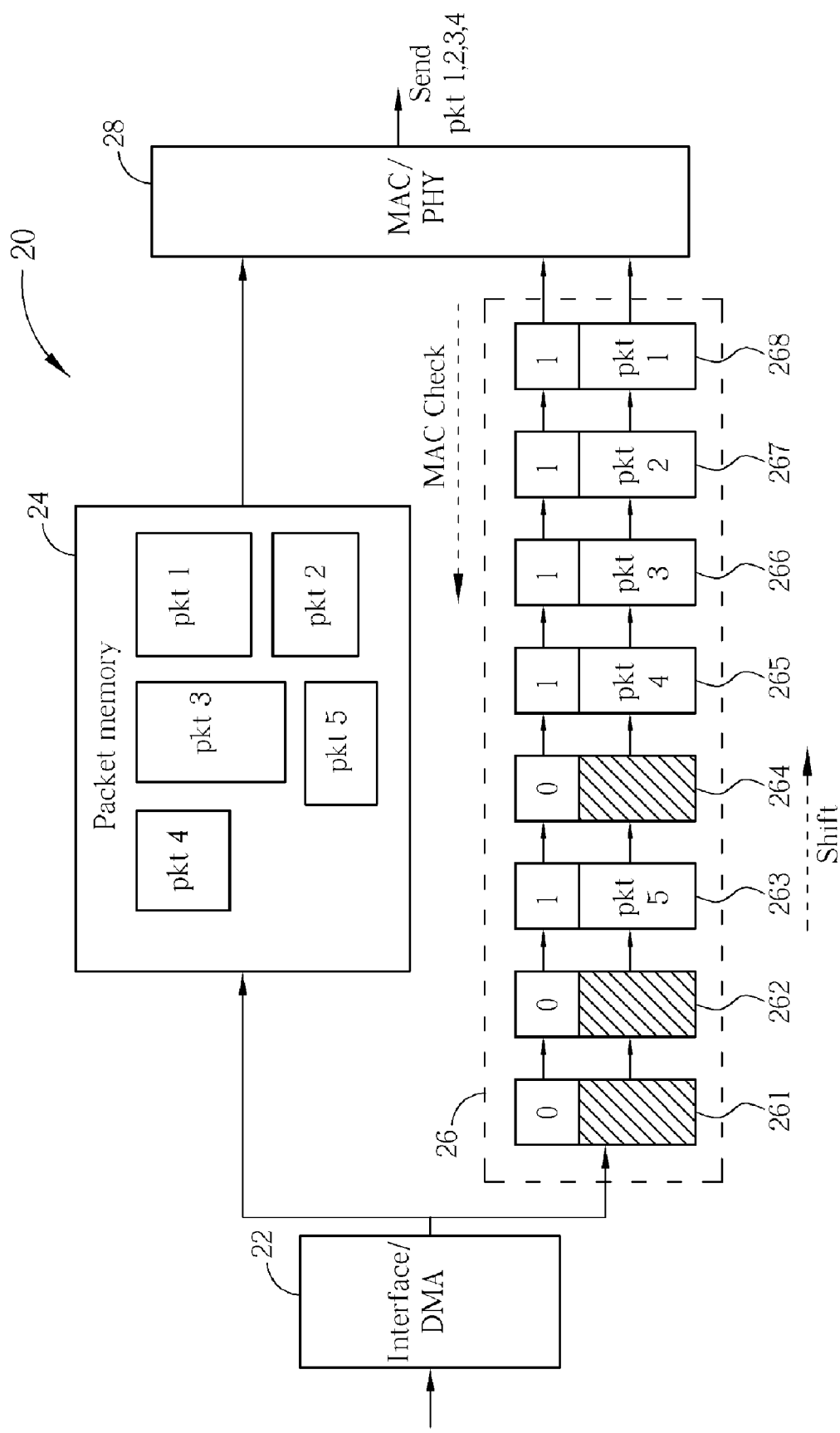

As shown in FIG. 3, the address data of the first packet pkt1 to the fifth packet pkt5 is transmitted in the shift register set 26 in the direction to the eighth shift register 268. Finally, the first packet pkt1 is transmitted to the eighth shift register 268, and the valid bit of the eighth shift register 268 is configured to "1". The second interface 28 checks each valid bit of the shift register from the eighth shift register 268 to the first shift register 261. The second interface 28 stops checking when detects the valid bit of the shift register is "0" In this embodiment, when the second interface 28 check the valid bit of the shift register, the fifth packet pkt5 is not transmitted to the fourth shift register 264 yet. The valid bit of the fourth shift register 264 is "0", so the second interface 28 stops checking at the fourth shift register 264. Thus, the second interface 28 reads the first packet pkt1 to the fourth packet pkt4 stored in the packet memory 24 according to the address data recorded in the eighth shift register 268 to fifth shift register 265, and sends the first packet pkt1 to the fourth packet pkt4 to the receiver in order.

Figure 4:
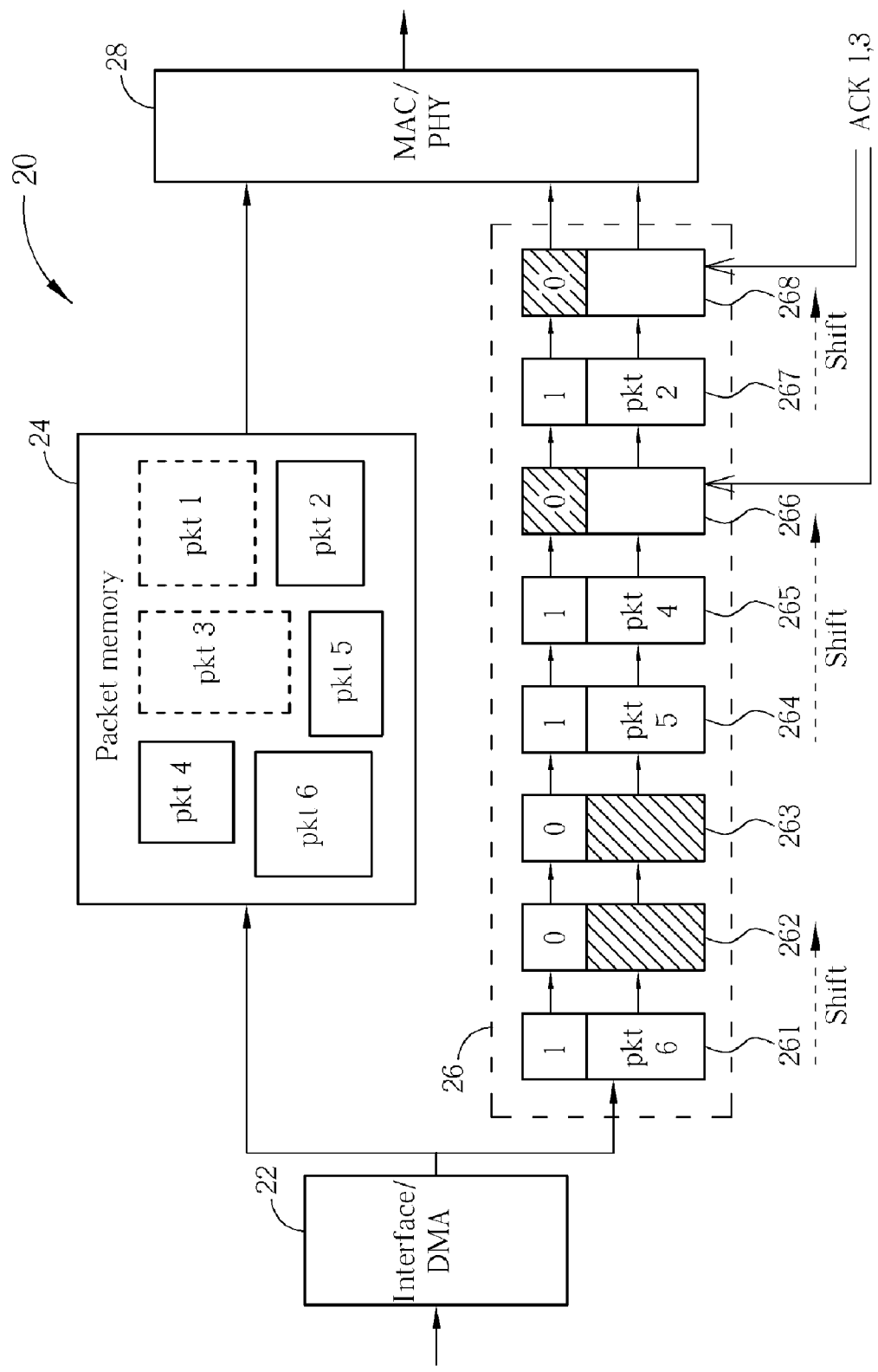

After receiving the packets from the wireless communication apparatus 20 correctly, the receiver sends acknowledge (ACK) signals of the packets to the wireless communication apparatus 20. After receiving the ACK signals of the packets, the wireless communication apparatus 20 configures the valid bits of the shift registers recorded the addresses of the packets to "0". As shown in FIG. 4, after sending the first packet pkt1 to the fourth packet pkt4, the wireless communication apparatus 20 only receives the ACK signals of the first packet pkt1 and the third packet pkt3 (ACK1, 3), so the valid bit of the eighth shift register 268 recorded the first packet pkt1 and the valid bit of the sixth shift register 266 recorded third packet pkt3 are configured to "0". In addition, when waiting the ACK signals from the receiver, the wireless communication apparatus 20 continues to receive the sixth packet pkt6 from the host. The first interface 22 stores the sixth packet pkt6 in the packet memory 24 and records the address of the sixth packet pkt6 in the first shift register 261.

Figure 5:
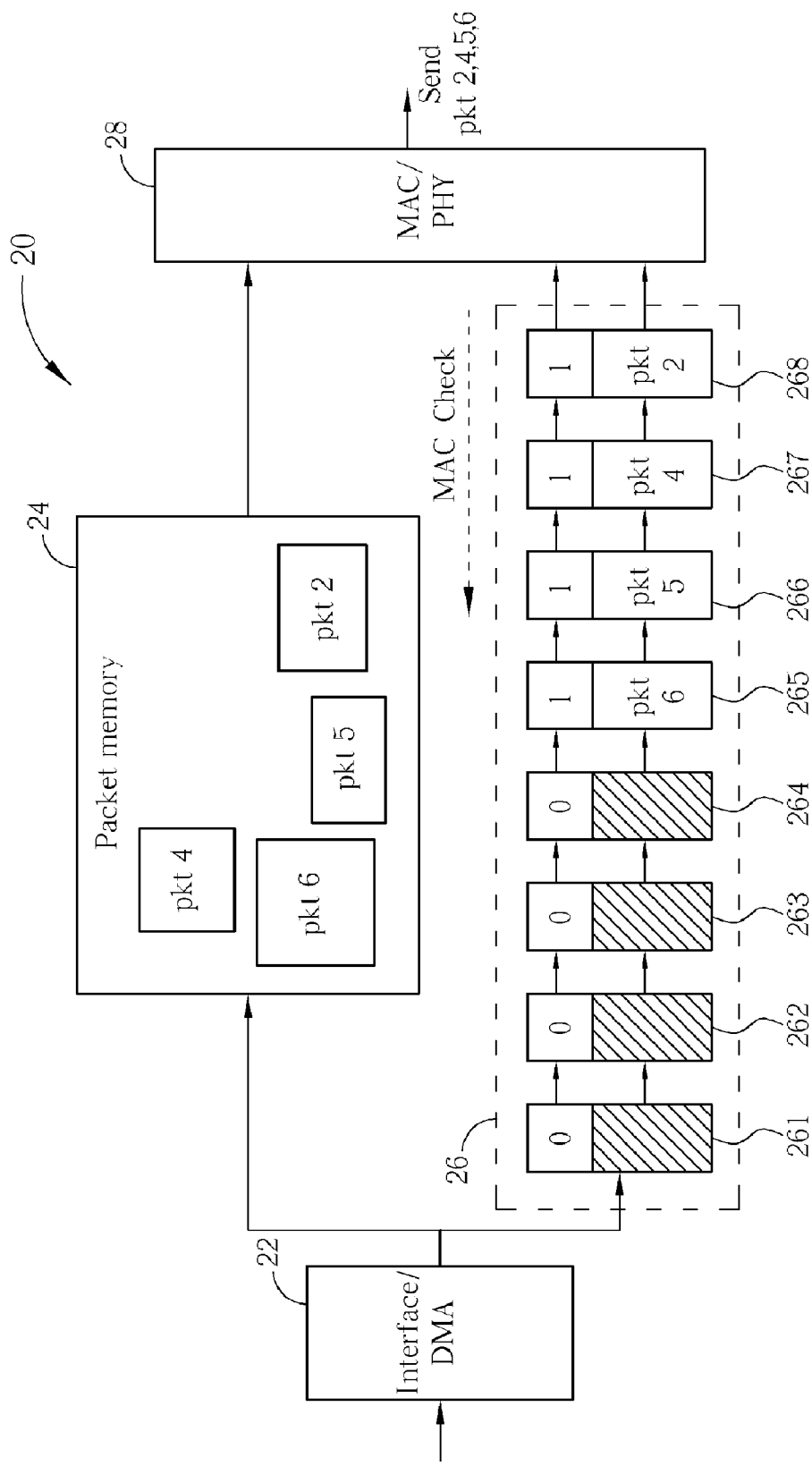

In FIG. 4, if the valid bit of the next shift register is "0", the shift register transmits the address of the packet to the next shift register. For example, the valid bit of the eighth shift register 268 is "0", so the seventh shift register 267 transmits the address of the second packet pkt2 to the eighth shift register 268, and the valid bit of the seventh shift register 267 is configured to "0". Thus, the address of the fourth packet pkt4 recorded in the fifth shift register 265 and the address of the fifth packet pkt5 recorded in the fourth shift register 264 are transmitted to the seventh shift register 267 and the sixth shift register 266 respectively. The address of the sixth packet pkt6 recorded in the first shift register 261 is transmitted to the fifth shift register 265 at last, as shown in FIG. 5. The second interface 28 checks each valid bit of the shift register again from the eighth shift register 268 and stops when the valid bit "0" of the shift register is detected. According to the addresses recorded in the eighth shift register 268 to fifth shift register 265, the second interface 28 reads the second, fourth, fifth, and sixth packet (pkt2, 4, 5, 6) stored in the packet memory 24, and sends the second, fourth, fifth, and sixth packet (pkt2, 4, 5, 6) to the receiver in order.

In conclusion, the wireless communication apparatus of the present invention comprises a first interface, a packet memory, a shift register set, and a second interface. The first interface receives a plurality of packets and stores the plurality of packets in the packet memory. The addresses of the plurality of packets stored in the packet memory are recorded in the shift register set. The shift register set comprises a plurality of shift registers for recording the plurality of addresses. Each address is inputted into the first shift register and is moved in the direction of the last shift register. The second interface reads the packets in the packet memory according to the addresses of the packets recorded in the shift register set and then sends to a receiver. After an acknowledge signals from the receiver is received, the addresses of the successfully transmitted packets are cleared from the shift register set. Thus, the wireless communication apparatus of the present invention uses the shift register set to implement the selective repeat scheme for ARQ effectively.

Those skilled in the art will readily observe that numerous modifications and alterations of the device and method may be made while retaining the teachings of the invention.

What is claimed is:

1. A wireless communication apparatus, comprising:
   a packet memory;
   a first interface coupled to the packet memory, for receiving a packet and storing the packet in the packet memory;
   a shift register set coupled to the first interface, for recording an address of the packet stored in the packet memory, the shift register set comprising a plurality of shift registers connected in series, the plurality of shift registers comprising a first shift register coupled to the first interface and a last shift register, each shift register having a valid bit for configuring the state of the shift register so as to transmit the address of the packet to the next shift register according to the valid bit of the next shift register; and
   a second interface coupled to the packet memory and the last shift register of the shift register set, for configuring the valid bits of the shift register set according to an acknowledge (ACK) signal of sending the packet, and accessing the shift register set so as to read and send the packet stored in the packet memory according to the address of the packet recorded in the shift register set.

2. The wireless communication apparatus of claim 1, wherein the first interface records the address of the packet in the first shift register according to the valid bit of the first shift register.

3. The wireless communication apparatus of claim 1, wherein the second interface checks the valid bits of the shift register set from the last shift register.

4. The wireless communication apparatus of claim 3, wherein the second interface reads the address of the packet recorded in the shift register set according to a result of checking the valid bits of the shift register set.

5. The wireless communication apparatus of claim 1, wherein the first interface comprises a direct memory access (DMA) interface.

6. The wireless communication apparatus of claim 1, wherein the second interface comprises a medium access control (MAC) or a physical layer (PHY).

7. A method of transmitting packets in a wireless communication system, comprising:
   receiving a plurality of packets;
   storing the plurality of packets in a packet memory;
   utilizing a shift register set to record addresses of the packets stored in the packet memory and inputting the address of the packet in a first shift register of the shift register set according to the order of receiving the plurality of packets;
   moving the address of the packet to the next shift register when the next shift register has no address of the packet
   reading and sending the plurality of packets stored in the packet memory according to the addresses of the plurality of packets; and
   clearing the addresses of the packets according to an acknowledge (ACK) signal of sending the plurality of packets.

8. The method of claim 7, wherein reading and sending the plurality of packets stored in the packet memory according to the addresses of the plurality of packets is reading and sending the plurality of packets stored in the packet memory according to the result of checking the successive shift registers having the addresses of the packets from the last shift register of the shift register set.

9. The method of claim 7, wherein clearing the addresses of the packets according to the ACK signal of sending the plurality of packets is configuring the shift registers recording the addresses of the packets to no address according to the ACK signal of sending the plurality of packets.

* * * * *